Figure 1:
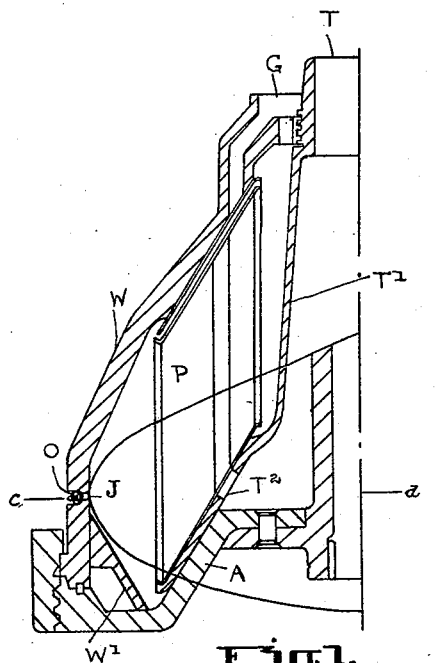

INVENTOR:
James Walter Adams
BY: Ruey, Boyer & Bakelew
ATTORNEYS.

Patented Dec. 10, 1929

1,738,553

UNITED STATES PATENT OFFICE.

JAMES WALTER ADAMS, OF BRADFORD, ENGLAND

CENTRIFUGAL LIQUID PURIFIER

Application filed June 22, 1928, Serial No. 287,548, and in Great Britain July 27, 1927.

This invention relates to improvements in the bowls of centrifugal purifiers.

In the separation of grease from wool washings considerable difficulty is experienced in expelling the finely divided solids which have been separated from the liquid and with a view to such expulsion various separators have been used amongst them "De Laval" separators which have achieved a certain amount of success; but owing to the accumulation of solid matter in the bowl frequent clearing becomes necessary.

According to my invention I propose an improved construction and arrangement of separator bowls of the said type, forming the bowl wall with a curved out or coned portion. In or towards the centre or greatest diameter of such curved out portion I provide a suitable number of apertures, which apertures are coned or made larger at the inside than the final outlet, and as it is desired to be able to control or adjust the size of the outlet means to this end will be provided. By constructing a separator bowl, in this manner the solid matter instead of accumulating against the solid wall of the bowl will be forced out by centrifugal force through one or more of the added apertures, the altered shape of the bowl acting as a guide to the apertures, and thus the machine may be used without continual stoppages for cleaning purposes.

To expel the solid matter, I have found it essential, at the same time, to pass through the apertures a quantity of liquid. The solid particles thus pass away in the form of a concentrated liquor.

In the process of wool washing, where it is customary to re-use a portion of the liquid or suint, it is necessary in order to keep down the concentration to a desired amount, to pass out of circulation a quantity of suint, which must be replaced with clean water.

I have found that I can utilize the suint, thus passed out of circulation, to assist in the washing away of the undesirable solids, and I arrange escape jets in the bowl substantially of the form and position hereinbefore described, of such a diameter as is large enough to pass the largest piece of solid matter likely to be met with, and yet small enough to pass only a fixed quantity of liquor per hour, which quantity is determined by the amount of concentrated dirty suint which is required to be replaced by water. The treated liquor from the bowl, as opposed to the waste liquor run away, will consist in grease and clean water. When same is passed away through the ordinary grease machine, such machine will not be liable to become blocked by solid matter as is now the case.

With my improved bowl, owing to its freedom from being blocked by solid matter I can run same constantly, and with one bowl supply liquor to say three grease machines, and to obtain a better grease therefrom. It is desirable to run the dirt expelling bowl at a higher speed (revolutions per minute) than the succeeding grease extracting bowls, thus ensuring that any particles of matter, which have already been subjected to the higher degree of centrifugation in the dirt expelling bowl, will not be deposited on the walls of the grease extracting bowl.

Figure 3:
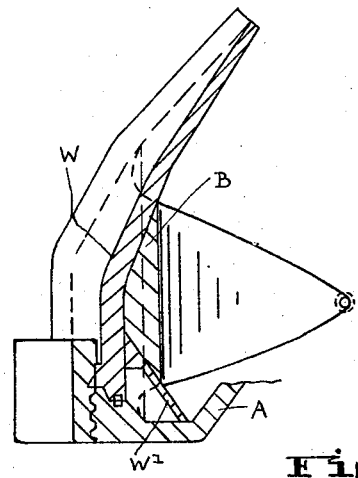
Figure 2:
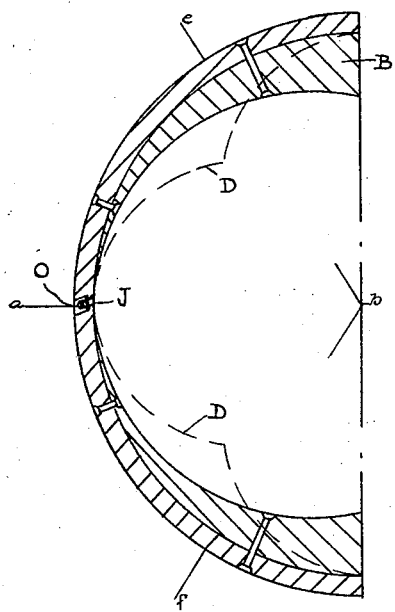

To carry out my invention and referring to the drawings which form part of the specification Fig. 1 represents a half sectional elevation of a bowl constructed according to my invention taken on line $a$—$b$ of Fig. 2 which represents a half section plan on line $c$—$d$ of Fig. 1 and Fig. 3 represents a half sectional elevation on line $e$—$f$ of Fig. 2.

To carry my invention into effect, I propose to utilize a separator of the usual "De Laval" type, but instead of the bowl being cylindrical as regards its outer walls W and $W^1$ I bulge out the walls from the upper and lower parts to give a rounded or coned inner contour, and in such curved or coned out portion and at its greatest diameter I construct or form a series of openings O extending around the bowl periphery, at suitable intervals, construction of the bowl will be such that there will be a lead inclining in all directions to the openings, each of which will be provided with a suitable jet J, the passage way through which may either be controllable or I may use jets of varying size depending on the conditions involved.

In treating a given quantity of liquor or suint it is important to note the amount which may be wasted or which is required in the wool washing process to be replaced by water. Therefore I construct the jets J of such a size as will permit during the operation of the machine, the passage per hour of a definite quantity of liquor and at the same time the jets must be of a bore sufficiently large to pass the largest pieces of dirt separated from the liquor. It is also important to construct the bowl that the jets are situated at the outer point of the greatest diameter and leads in every direction gradually inclining somewhat conewise to the jets are provided. In some forms say two oppositely placed jets J may be provided and by means of curved lining blocks B the necessary coning will be provided. I have however shewn by dotted lines D in Fig. 2 an arrangement for utilizing four jets.

I have as far as permissible shewn in the drawings a form of construction on the lines of the usual separator bowls with of course the exception of the inclining walls W and W¹, the dirty liquor being fed in at the top T, but instead of leading to the base of the discs or plates P the descending pipe or like T¹ meets the base piece A and admission to the plates is above their base at or about the point T². The waste matter escapes through the jets J and the grease and clean liquor from the outlet G. The action of the separator is to direct the solid matter with the waste to the jets J and owing to the sweeping action and the curvature towards the jets no solid matter will rest thereon and consequently the solids will be driven out with the escaping waste and no accumulation of soild matter will take place within the bowl, therefore the bowl may be run for long continuous periods without necessitating frequent stoppages for cleaning, such as are now experienced with separators of the usual type. As a further result I am enabled to obtain a constant output of clear liquor and grease, and this enables one bowl of my type to supply up to three of the usual grease extracting machines and further ensures the production of better grease.

I find in some forms that by re-treating the cleansed liquor in a following apparatus I may obviate the use of the usual grease extracting machines.

My hereinbefore described apparatus is primarily intended for use with wool washing, but I may apply same for other purifying purposes, such as for cleansing liquids lighter than water, and by adding water thereto to the capacity per hour of the jets such water will escape from the jets taking with it the separated matter.

What I claim is:—

1. In a centrifugal separator, a bowl having an outer wall provided with a plurality of escape openings having their axes in a common plane perpendicular to the axis of rotation of the bowl, the inner surface of said wall being inclined inwardly from said openings both above and below the openings, the inner surface of the wall at said openings being arcuately lobular in plan with each opening at the center of a respective arcuate portion.

2. In a centrifugal separator, a bowl having an outer wall provided with a plurality of escape openings having their axes in a common plane perpendicular to the axis of rotation of the bowl, the inner surface of said wall being inclined inwardly from said openings both above and below the openings, said bowl having an inner frusto-conical wall extending upwardly from the bottom of the bowl, means to close the lower part of the bowl at the upper end of the frusto-conical wall, a feed pipe extending into said bowl through its top and concentrically spaced within the edge of said top, a flaring nozzle extending down from said pipe and provided with a frusto-conical lower end fitting on said frusto-conical wall, said lower end being provided with escape ports just above said frusto-conical wall, and plates extending from said lower end to the upper part of the outer wall.

In testimony whereof I have signed my name to this specification.

JAMES WALTER ADAMS.